(12) United States Patent
Schiffmann et al.

(10) Patent No.: US 8,055,445 B2
(45) Date of Patent: Nov. 8, 2011

(54) PROBABILISTIC LANE ASSIGNMENT METHOD

(75) Inventors: Jan K. Schiffmann, Newbury Park, CA (US); David A. Schwartz, Moorpark, CA (US)

(73) Assignee: Delphi Technologies, Inc., Troy, MI (US)

( * ) Notice: Subject to any disclaimer, the term of this patent is extended or adjusted under 35 U.S.C. 154(b) by 593 days.

(21) Appl. No.: 12/284,721

(22) Filed: Sep. 24, 2008

(65) Prior Publication Data

US 2010/0076684 A1    Mar. 25, 2010

(51) Int. Cl.
*G01S 13/93* (2006.01)

(52) U.S. Cl. .......... 701/301; 701/117

(58) Field of Classification Search .......... 701/117–119, 701/300, 301; 340/435, 901, 903, 904, 933–935, 340/988, 989; 342/70, 146; 382/104, 106
See application file for complete search history.

(56) References Cited

U.S. PATENT DOCUMENTS

| | | | | |
|---|---|---|---|---|
| 5,510,990 A * | 4/1996 | Hibino et al. | ...... | 701/96 |
| 5,555,312 A * | 9/1996 | Shima et al. | ...... | 382/104 |
| 5,710,565 A | 1/1998 | Shirai et al. | | |
| 5,890,083 A * | 3/1999 | Franke et al. | ...... | 701/45 |
| 5,926,126 A | 7/1999 | Engelman | | |
| 6,035,053 A | 3/2000 | Yoshioka et al. | | |
| 6,085,151 A * | 7/2000 | Farmer et al. | ...... | 701/301 |
| 6,292,752 B1 * | 9/2001 | Franke et al. | ...... | 701/300 |
| 6,470,272 B2 | 10/2002 | Cong et al. | | |
| 6,556,916 B2 * | 4/2003 | Waite et al. | ...... | 701/117 |
| 6,570,998 B1 * | 5/2003 | Ohtsuka et al. | ...... | 382/104 |
| 6,583,752 B2 * | 6/2003 | Samukawa et al. | ...... | 342/70 |
| 6,643,588 B1 * | 11/2003 | Ibrahim | ...... | 701/301 |
| 6,653,935 B1 * | 11/2003 | Winner et al. | ...... | 340/435 |
| 6,665,614 B2 * | 12/2003 | Sekiguchi | ...... | 701/301 |
| 6,675,094 B2 * | 1/2004 | Russell et al. | ...... | 701/301 |
| 6,718,259 B1 * | 4/2004 | Khosla | ...... | 701/200 |
| 6,819,779 B1 * | 11/2004 | Nichani | ...... | 382/104 |
| 6,842,531 B2 * | 1/2005 | Ohtsuka et al. | ...... | 382/104 |

(Continued)

FOREIGN PATENT DOCUMENTS

EP    0915350    5/1999

(Continued)

OTHER PUBLICATIONS

Ogawa et al., Lane Recognition Using On-Vehicle LIDAR, Jun. 2006, IEEE Intelligent Vehicles Symposium 2006, pp. 540-545.*

(Continued)

*Primary Examiner* — Thomas Black
*Assistant Examiner* — LIndsay M Browder
(74) *Attorney, Agent, or Firm* — Thomas N. Twomey (57) ABSTRACT

An improved probabilistic lane assignment method for detected objects in the scene forward of a host vehicle. Road/lane model parameters, preferably including an angular orientation of the host vehicle in its lane, are estimated from host vehicle sensor systems, taking into account measurement uncertainty in each of the constituent parameters. A probabilistic assignment of the object's lane is then assessed based on the road/lane model parameters and object measurements, again taking into account measurement uncertainty in both the road/lane model and object measurements. According to a first embodiment, the probabilistic assignment is discrete in nature, indicating a confidence or degree-of-belief that the detected object resides in each of a number of lanes. According to a second embodiment, the probabilistic assignment is continuous in nature, providing a lateral separation distance between the host vehicle and the object, and a confidence or degree-of-belief in the lateral separation distance.

14 Claims, 6 Drawing Sheets

U.S. PATENT DOCUMENTS

| | | | |
|---|---|---|---|
| 7,034,742 B2 | 4/2006 | Cong et al. | |
| 7,379,815 B2 * | 5/2008 | Kobayashi et al. | 701/300 |
| 7,386,385 B2 * | 6/2008 | Heinrichs-Bartscher | 701/93 |
| 7,447,592 B2 * | 11/2008 | Yopp et al. | 701/301 |
| 7,460,951 B2 * | 12/2008 | Altan et al. | 701/207 |
| 7,522,091 B2 * | 4/2009 | Cong et al. | 342/70 |
| 7,542,825 B2 * | 6/2009 | Kawasaki | 701/1 |
| 7,561,720 B2 * | 7/2009 | Miyahara | 382/104 |
| 7,561,721 B2 * | 7/2009 | Miyahara | 382/104 |
| 7,579,942 B2 * | 8/2009 | Kalik | 340/435 |
| 7,626,533 B2 * | 12/2009 | Cong et al. | 342/70 |
| 7,742,864 B2 * | 6/2010 | Sekiguchi | 701/96 |
| 2003/0055563 A1 * | 3/2003 | Lars et al. | 701/301 |
| 2004/0167717 A1 * | 8/2004 | Buchanan et al. | 701/301 |
| 2005/0086003 A1 * | 4/2005 | Tarabishy et al. | 701/301 |
| 2005/0179580 A1 | 8/2005 | Cong et al. | |
| 2007/0027597 A1 * | 2/2007 | Breuel et al. | 701/41 |

FOREIGN PATENT DOCUMENTS

| | | |
|---|---|---|
| EP | 1065520 | 1/2001 |

OTHER PUBLICATIONS

Weiss et al., Environmental Perception and Situation Assessment for an Advanced Highway Assistant, Jun. 2005, Proceedings of the IEEE Intelligent Vehicles Symposium 2005, pp. 472-477.*

Gern et al., Robust Vehicle Tracking Fusing Radar and Vision, 2001, International Conference on Multisensor Fusion and Integration for Intelligent Systems 2001 (MFI '01), pp. 323-328.*

Kirchner et al., Integrated Obstacle and Road Tracking Using a Laser Scanner, 2000, Proceedings of the IEEE Intelligent Vehicles Symposium 2000, pp. 675-681.*

Hywel, Variable Time-Constant Low-Pass Filters Using Kalman Filter Algorithms, 1999, Retrieved on May 11, 2011 from http://www.clsp.jhu.edu/ws98/projects/dynamic/presentations/finalhtml/node43.html.*

Fisher, The Mathematical Theory of Probabilities, 1922, The Macmillan Company: New York, vol. 1, Second Edition, pp. 28-29.*

* cited by examiner

PROBABILISTIC LANE ASSIGNMENT METHOD

TECHNICAL FIELD

The present invention relates to threat assessment for a vehicle collision warning/avoidance system or the like, and more particularly to a probabilistic method of lane assignment for detected objects in a scene forward of the host vehicle.

BACKGROUND OF THE INVENTION

A conventional approach to threat assessment in vehicle collision warning/avoidance systems is to predict the forward travel path of the host vehicle based on parameters such as speed and yaw rate and to determine if a detected object is in the lane occupied by the host vehicle or a different lane. However, the predicted forward travel path does not necessarily provide a reliable indication of the forward road/lane model due to measurement uncertainty and other reasons such as host and target vehicle maneuvering, and there is no convenient way to assess the confidence of the same-lane/different-lane determination.

The U.S. Pat. No. 7,034,742 to Cong et al. describes another approach in which different possible trajectories of a detected object corresponding to the various lanes of the roadway are modeled with different constraint equations, assuming that the host vehicle is tracking its lane. The degree of agreement between the modeled trajectories and successive measurements of the object position is evaluated to assess the validity or degree-of-belief of the various constraint equations. And the validity or degree-of-belief for a given constraint equation reflects the probability that the detected object is traveling in the respective lane. While the objective of providing a probabilistic assessment of lane assignment is desirable, the approach described by Cong et al. has significant drawbacks and limitations. For example, the assumption that the host vehicle is tracking its lane may be inaccurate, and the various measurements and assumptions about the roadway geometry all have a degree of uncertainty that is not taken into account. Furthermore, the requirement of evaluating the constraint equations over a series of successive measurements results in an undesirable delay between detection of an object and its assignment to a particular lane.

Accordingly, what is needed is an improved method of determining a probabilistic assessment of lane assignment for a detected object that takes into account movement of the host vehicle in its lane and uncertainty in the measured and assumed parameters, and that provides substantially immediate probabilistic lane assignment.

SUMMARY OF THE INVENTION

The present invention is directed to an improved probabilistic lane assignment method for detected objects in the scene forward of a host vehicle. Road/lane model parameters, preferably including an angular orientation of the host vehicle in its lane, are estimated from host vehicle sensor systems, taking into account measurement uncertainty in each of the constituent parameters. A probabilistic assignment of the object's lane is then assessed based on the road/lane model parameters and object measurements, again taking into account measurement uncertainty in both the road/lane model and object measurements. According to a first embodiment, the probabilistic assignment is discrete in nature, indicating a confidence or degree-of-belief that the detected object resides in a given one of a number of lanes. According to a second embodiment, the probabilistic assignment is continuous in nature, providing a lateral separation distance between the host vehicle and the object, and a confidence or degree-of-belief in the lateral separation distance.

DESCRIPTION OF THE PREFERRED EMBODIMENT

Figure 1:
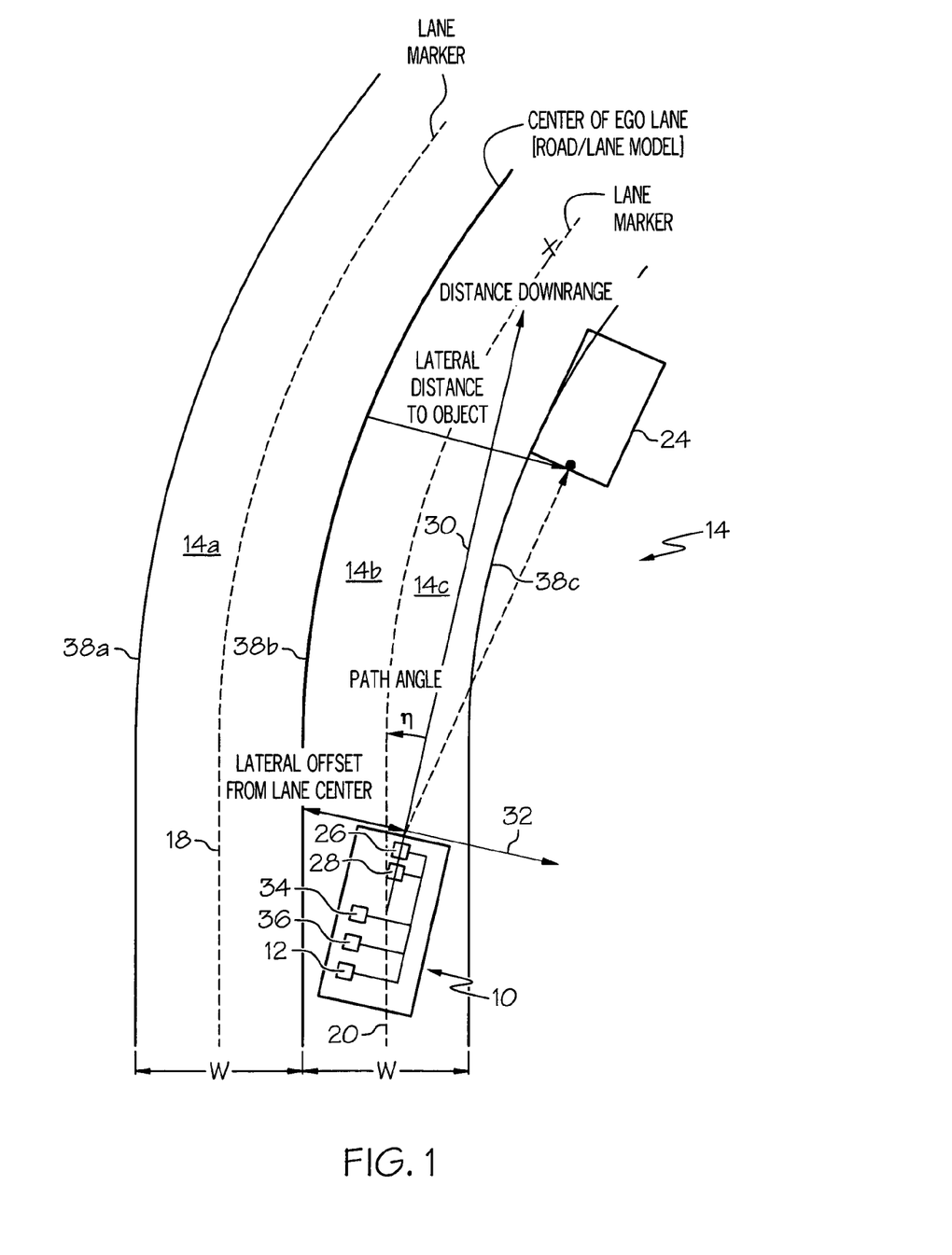
FIG. 1 is a diagram of a host vehicle traveling on a roadway and a host vehicle system for carrying out the method of this invention.

Referring to the drawings, and particularly to FIG. 1, the reference numeral 10 generally designates a host vehicle equipped with a processor 12 for carrying out the probabilistic lane assignment method of the present invention. The reference numeral 14 generally designates a curved roadway divided into three lanes 14a, 14b, 14c by a model of their respective lane centers 38a, 38b, 38c. In the illustration, the host vehicle 10 is traveling with a lateral offset from the host's ego lane center 38b, and another vehicle 24 preceding the host vehicle 10 is traveling in the lane 14c to the right of the host's ego lane 14b. The host vehicle 10 is equipped with a forward-looking radar system 26 for identifying objects of interest such as the preceding vehicle 24, and preferably a vision system 28 for identifying proximate lane markers 18, 20. The measurements of radar system 26 and vision system 28 are referenced to a two-dimensional host coordinate system identified in FIG. 1 by the X and Y axes 30 and 32, where the X-axis 30 coincides with the longitudinal axis of the host vehicle 10, and the Y-axis 32 is aligned with the front of the host vehicle 10. In reference to preceding vehicle 24, for example, the radar system 26 provides two distance measurements: a downrange distance along the X-axis 30 and a lateral distance parallel to Y-axis 32. In reference to the lane markers 18 and 20, the vision system 28 provides lateral distances parallel to Y-axis 32. Additional host vehicle measurements are provided by yaw-rate sensor 34 and speed sensor 36. The various measurements are provided to processor 12, which models road/lane center model 38b to predict its downrange lateral offset from the ego lane center relative to the host coordinate system, and performs a probabilistic lane assignment for the preceding vehicle 24. The lane assignment, in turn, can be provided to a host vehicle threat assessment system such as a collision warning/avoidance system or an adaptive cruise control system.

The road/lane model is based on a clothoid model of the lane center of the host or ego lane 14b. Given a downrange distance x, the lateral offset of the host lane center can be determined from a standard clothoid road curvature model, expressed in simplest form as:

$$c(x) = c_0 + c_1 x \quad (1)$$

where the downrange distance x is in meters, and the variable c designates road curvature in radians/meter. In general, road curvature is the inverse of radius-of-curvature, and indicates how much the heading of road/lane center changes as it moves downrange. In equation (1), c(x) denotes the road curvature at downrange distance x, $c_0$ denotes the curvature underneath host vehicle 10, and $c_1$ denotes the rate at which the road curvature changes forward of host vehicle 10. The term $c_0$ can be calculated as $$c_0 = \frac{\omega}{v},$$

where $\omega$ is the host vehicle yaw-rate provided by yaw-rate sensor 34, and v is the host vehicle speed provided by speed sensor 36. The term $c_1$ can be estimated by filtering $c_0$ through a rate estimate filter such as an Alpha-Beta filter, or other means such as scene tracking, but in the illustrated embodiment, the term $c_1$ is set to zero.

A downrange preceding object 24 has an offset distance from the ego lane center of the host lane 14b (measured in the host lateral coordinate direction). Alternately, the offset distance can be measured from the object 24 to the nearest point on the ego center line. This offset is called the lane number when expressed in units of the host lane width. Given the road/lane model and an estimate of the host vehicle heading in lane, and optionally the lane offset from the host lane center, the preceding object's position in lane number can be determined from the object's position estimate by radar system 26. The lane number of an object is determined by representing the road/lane center model in the host vehicle's coordinate system. Accordingly, measurement data from the various sensors is transformed to the host coordinate system.

The host vehicle path angle, $\eta$, describes the angular orientation of the host vehicle coordinate system with respect to the lane markers 18, 20 of lane 14b. The path angle $\eta$ changes as the host vehicle 10 weaves within the lane 14b, and may be detected by vision system 28 or other means. Integrating equation (1) to give the road heading angle $\psi(x)$ in host coordinates at a downrange distance x, given the path angle $\eta$ yields:

$$\psi(x) = c_0 x + \frac{1}{2} c_1 x^2 + \eta \quad (2)$$

And finally, integrating equation (2) to give the lateral position, y, of the host lane center (in host coordinates) at a downrange distance x yields:

$$y(x) = \frac{1}{2} c_0 x^2 + \frac{1}{6} c_1 x^3 + \eta x \quad (3)$$

Referring to FIG. 1, equation (3) gives the lateral offset y coordinate of the ego lane center at any point with downrange distance x, in host coordinates.

The road/lane center model parameters $c_0$, $c_1$ and $\eta$ are estimated by the host vehicle sensors as described above, and their joint uncertainty can be expressed as a normal (Gaussian) distribution having a mean and a covariance. The parameter set is designated as $\theta$, and having a mean $\bar{\theta}$. That is:

$$\bar{\theta} = [\bar{c}_0 \bar{c}_1 \bar{\eta}]^T \quad (4)$$

and a covariance matrix $\Sigma_{\theta\theta}$. The mean and the covariance matrix terms can be estimated by low pass filtering over an appropriate time scale or by other means. A preferred approach is to use $2^{nd}$ order Butterworth filters, assuming a discrete time system with discrete sampling of the sensed parameters. For example, in an embodiment where the term $c_1$ is assumed to be zero, the kth samples of $c_0$ and $c_1$ can be represented as:

$$c_0^{(k)} = \frac{\omega^{(k)}}{v^{(k)}} \text{ and } c_1^{(k)} = 0 \quad (5)$$

The covariance matrix is defined as:

$$\Sigma_{\theta\theta}^{(k)} = \begin{bmatrix} \Sigma_{c_0 c_0}^{(k)} & \Sigma_{c_0 c_1}^{(k)} & \Sigma_{c_0 \eta}^{(k)} \\ \Sigma_{c_1 c_0}^{(k)} & \Sigma_{c_1 c_1}^{(k)} & \Sigma_{c_1 \eta}^{(k)} \\ \Sigma_{\eta c_0}^{(k)} & \Sigma_{\eta c_1}^{(k)} & \Sigma_{\eta \eta}^{(k)} \end{bmatrix} \quad (6)$$

where $$\Sigma_{c_1 c_1}^{(k)} = \Sigma_{c_0 c_1}^{(k)} = \Sigma_{c_1 c_0}^{(k)} = \Sigma_{c_1 \eta}^{(k)} = \Sigma_{\eta c_1}^{(k)} = 0, \text{ and } \Sigma_{c_0 \eta}^{(k)} = \Sigma_{\eta c_0}^{(k)} \quad (7)$$

$$\Sigma_{c_0 c_0}^{(k)} = lowpass((c_0^{(k)} - lowpass(c_0^{(k)}))^2) \quad (8)$$

$$\Sigma_{\eta\eta}^{(k)} = lowpass((\eta^{(k)} - lowpass(\eta^{(k)}))^2) \quad (9)$$

$$\Sigma_{c_0 \eta}^{(k)} = lowpass((c_0^{(k)} - lowpass(c_0^{(k)}))(\eta^{(k)} - lowpass(\eta^{(k)}))) \quad (10)$$

In the above equations, lowpass(x) represents the output of the recursive low-pass filter at the kth sample, given the current input sample x.

For the resulting matrix to be a valid covariance matrix estimate, the matrix must be "symmetric positive definite". A sufficient condition is that the low-pass filter must be a "positive system". In practice, there is a tradeoff between the latency of the filter and, the low-pass filter response, and the "positive system" constraint. Since the preferred Butterworth low-pass filter is not a "positive system", negative diagonal elements of the matrix are zeroed, and the resulting matrix is tested to determine if it is symmetric positive definite. If it is not symmetric positive definite, the covariance matrix is approximated by additionally setting all of the off-diagonal elements to zero.

As represented in equations (8) through (10), the covariance terms measure how the samples differ from the mean. To reduce the latency in the covariance estimate, a slow filter (long time constant) is used to estimate the mean, and a fast filter (short time constant) is used to estimate the covariance terms, as indicated below:

$$\Sigma_{c_0 c_0}^{(k)} = \max\left(0, lowpass_{fast}((c_0^{(k)} - lowpass_{slow}(c_0^{(k)}))^2)\right) \quad (8a)$$

$$\Sigma_{\eta\eta}^{(k)} = \max\left(0, lowpass_{fast}((\eta^{(k)} - lowpass_{slow}(\eta^{(k)}))^2)\right) \quad (8b)$$

$$\Sigma_{c_0\eta}^{(k)} = lowpass_{fast}((c_0^{(k)} - lowpass_{slow}(c_0^{(k)}))(\eta^{(k)} - lowpass_{slow}(\eta^{(k)}))) \quad (8c)$$

Other quantities such as the lateral position of preceding vehicle 24 relative to the host vehicle coordinate system, the lateral positions of the left and right lane markings 18 and 20, and the width of lane 14b are modeled using normal (Gaussian) distributions, and therefore can be represented by their means and variances. Certain quantities such as the lane width mean and variance can be set to default values instead of measured values. Also, the mean lane width may be based on a recent history of measurements.

The lane marker positions and variances depend on how many lane markers are identified by vision system 28. If left and right lane markers 18 and 20 are both identified, the reported positions are used as mean values, and the variance can be determined based on a confidence indication provided by the vision system 28. If only one lane marker is identified, the mean of the other lane marker is calculated using the default or measured lane width, and the variance is determined by adding the variances of the one lane marker position and the lane width. If no lane markers are identified, the processor 12 assumes that host vehicle 10 is centered in lane 14b with mean offsets of one-half the mean lane width, and a variance as described above. Lane marker positions more distant from host vehicle 10 are estimated in a similar way, at each step adding (or subtracting) a mean lane width and adding in the lane width variance. As a result, the uncertainty in the positions of the lane markers increases with their distance from host vehicle 10.

The object coordinates provided by radar system 26 are combined with the estimated road/lane model information to assess relative lane assignment probability distributions for the detected object (preceding vehicle 24, for example). The lane assignment probabilities may be determined on either a discrete basis or a continuous basis. The discrete basis can be arranged to provide a degree-of-belief in each of the following propositions concerning the relative location of the detected object: (1) the object is three or more lanes to the left of host vehicle 10; (2) the object is two lanes to the left of host vehicle 10; (3) the object is one lane to the left of host vehicle 10; (4) the object is in the same lane as host vehicle 10; (5) the object is one lane to the right of host vehicle 10; (6) the object is two lanes to the right of host vehicle 10; and (7) the object is three or more lanes to the right of host vehicle 10. On the other hand, the continuous basis provides a separation distance between host vehicle 10 and the detected object in units of lanes (2.3 lanes, for example), along with a corresponding degree-of-belief. In each approach, the probabilistic assessment takes into account uncertainties in the road/lane model parameters, the orientation of host vehicle 10 in lane 14b, the lane width, the lane marker positions and the lateral position of the detected object.

Under the discrete lane assignment approach, the probability that the detected object resides in a particular lane relative to host vehicle 10 is determined by combining the probable locations of host vehicle 10 (H) and the detected object (O). For example, the probability that preceding vehicle 24 is one lane to the right of host vehicle 10 is determined by combining the probability H that host vehicle is in lane 14b and the probability O that preceding vehicle 24 is in lane 14c. However, uncertainty in identifying the host lane markings entails a certain probability (however small) that host vehicle origin of coordinates is actually in lane 14a or 14c instead of lane 14b. To account for this possibility in the lane assignment probability assessment, the lane assignment probabilities are summed for each of three possibilities: (1) host vehicle 10 is in lane 14a; (2) host vehicle 10 is in lane 14b; and (3) host vehicle 10 is in lane 14c. For example, the probability $P_i$ that the detected vehicle 24 is i lanes to the right of host vehicle 10 is calculated as:

$$P_i = \sum_{j=-1}^{1} H_j O_{j+i} \quad (11)$$

where $H_j$ is the probability that the host vehicle 10 is j lanes to the right of lane 14b, and $O_j$ is the probability that the detected object is j lanes to the right of lane 14b.

The H values in equation (11) are determined by allotting the Gaussian distributions for the left and right lane markers 18, 20. For example, a Gaussian distribution for the position of the left lane marker 18 is centered at the reported position, and has a calculated variance. The amount of probability mass in that distribution which is to the right of the host origin of coordinates is $H_{-1}$, the probability that host vehicle 10 is actually in lane 14a. A corresponding calculation is performed on the Gaussian distribution for the position of the right lane marker 20 to get $H_1$, the probability that host vehicle 10 is actually in lane 14c. The remaining probability mass is put into $H_0$, the probability that host vehicle 10 is in lane 14b.

The O values in equation (11) are expressed as a difference of cumulative probabilities. By way of example in reference to FIG. 1, the probability that preceding vehicle 24 is in lane 14c is the probability that preceding vehicle 24 is to the left of lane marker 22 less the probability that preceding vehicle 24 is to the left of lane marker 20. If the lane markers are numbered 1, 2 and 3 to the right of host vehicle 10, and 0, −1 and −2 to the left of host vehicle 10, the probability $O_j$ can be expressed as:

$$O_j = T_{j+1} - T_j \quad (12)$$

where $T_j$ is the probability that preceding vehicle 24 is somewhere to the left of lane marker j, and $T_{j+1}$ is the probability that preceding vehicle 24 is somewhere to the left of lane marker j+1.

The probability $T_j$ that preceding vehicle 24 is to the left of lane marker j is the probability that $(y_t - y_h) < y_l$, or $(y_t - y_h - y_l) < 0$, where $y_t$ is the lateral position of preceding vehicle 24, $y_h$ is the lateral position of the host's lane position downrange at the object, and $y_l$ is the lateral position of the $j^{th}$ lane marker, all in host coordinates. The quantity $(y_t - y_h - y_l)$ is a normal random variable, the mean and variance of which are calculated from the means and variances of its constituent components. Hence the probability $T_j$ is computed as the value of the cumulative distribution function for quantity $(y_t - y_h - y_l)$ at zero.

The mean and variance of the term $y_t$ are provided by radar system 26. The term $y_h$ has a mean of $\bar{y}_h = g^T \bar{\theta}$, where $$g^T = \left[ \frac{1}{2} x^2 \quad \frac{1}{6} x^3 \quad x \right] \text{ and } \bar{\theta} = [\bar{c}_0 \quad \bar{c}_1 \quad \bar{\eta}]^T \quad (13)$$

The variance of $y_h$ is given by:

$$\sigma_h^2 = g^T \Sigma_{\theta\theta} g \quad (14)$$

where $\Sigma_{\theta\theta}$ is the covariance matrix of the road/lane model parameters θ, as mentioned above. The mean and variance of $y_j$ (the lateral position of the $j^{th}$ lane marker) depend on the value of j. For example, the mean of lane marker 22 (i.e., j=2) is:

$$\bar{y}_l = \bar{y}_r + \bar{w} \quad (15)$$

where $\bar{y}_r$ is the mean position of lane marker 20, and $\bar{w}$ is the mean lane width. The variance in this example is given by:

$$\sigma_l^2 = \sigma_r^2 + \sigma_w^2 \quad (16)$$

where $\sigma_r^2$ is the variance of the position of lane marker 20, and $\sigma_w^2$ is the variance of lane width w.

Under the continuous lane assignment approach, the probable location of a detected object relative to host vehicle 10 is determined by defining a lane number L for the detected object, and calculating its mean and variance. The lane number L is a real-valued description of the relative lateral position of the detected object in units of lanes, and is calculated as:

$$L = \frac{y_t - y_h + d}{w} \quad (17)$$

where $y_t$ is the lateral position of the detected object, $y_h$ is the downrange lateral position of host vehicle 10, d is the lateral offset distance of host vehicle 10 from the center of lane 14b, and w is the lane width. Under the assumption that $y_t$, $y_h$, d and w are all normal random variables, the lane number L is also approximately normal if the variance of the lane width w is small. Approximate expressions for the mean and variance of lane number L can be obtained using a Taylor series expansion. If the term n is used to denote the numerator of equation (17), the lane number L can be approximated as a function of n and w, and their means (signified by over-bar) as:

$$L(n, w) \approx L(\bar{n}, \bar{w}) + \frac{\partial L}{\partial n}(\bar{n}, \bar{w})(n - \bar{n}) + \quad (18)$$
$$\frac{\partial L}{\partial w}(\bar{n}, \bar{w})(w - \bar{w}) + \frac{1}{2}\frac{\partial^2 L}{\partial n^2}(\bar{n}, \bar{w})(n - \bar{n})^2 +$$
$$\frac{1}{2}\frac{\partial^2 L}{\partial w^2}(\bar{n}, \bar{w})(w - \bar{w})^2 + \frac{\partial^2 L}{\partial n \partial w}(\bar{n}, \bar{w})(n - \bar{n})(w - \bar{w})$$

Assuming independence of n and w, the mean value of lane number L is given approximately as:

$$\bar{L} \approx L(\bar{n}, \bar{w}) + \frac{1}{2}\frac{\partial^2 L}{\partial n^2}(\bar{n}, \bar{w})\sigma_n^2 + \frac{1}{2}\frac{\partial^2 L}{\partial w^2}(\bar{n}, \bar{w})\sigma_w^2 \quad (19)$$
$$= \frac{\bar{n}}{\bar{w}} + \frac{\bar{n}}{\bar{w}^3}\sigma_w^2$$

In a similar way, the variance of lane number L is obtained as:

$$\sigma_L^2 \approx \frac{1}{\bar{w}^2}\sigma_n^2 + \frac{\bar{n}^2}{\bar{w}^4}\sigma_w^2 \quad (20)$$

The mean and variance of lane width w are determined from the vision system 28 or the measurements themselves, and the mean and variance of n are determined by combining the means and variances of $y_t$, $y_h$ and d.

It is possible, of course, that host vehicle 10 is equipped with additional sensor sub-systems that provide information that overlaps or complements the information provided by radar system 26 and vision system 28. Road/lane model estimates gleaned from such additional sensor sub-systems can be fused with the above-described road/lane model estimates using one or more fusion methods known in the art. For example, the method described by Bar-Shalom et al. in the IEEE Transactions on Aerospace Electronic Systems, Vol. AES-22, No. 6, pp. 803-805 (1986), and incorporated herein by reference, may be used to fuse road/lane model estimates obtained from two different sensor sub-systems. And Zhou et al. have described a generalization of the Bar-Shalom method in the IEEE Transactions on Systems, Man and Cybernetics, Vol. 36, No. 5, pp. 1000-1008 (2006), also incorporated herein by reference, for fusing parameters obtained from three or more sensor sub-systems. Alternatively, information from the additional sensor systems may be used to determine probabilistic lane assignments for a detected object, and the above-referenced methods may be used to fuse the different lane assignment parameters.

Regardless of how the lane assignment probability masses are determined, the processor 12 uses information regarding a detected object, its lane assignment, and the assignment degree-of-belief to assess the threat the object poses to host vehicle 10. This threat assessment may be part of a collision warning and/or avoidance system, or an adaptive cruise control system, for example.

The flow diagrams of FIGS. 2A-2B, 3, 4A-4B and 5 summarize the above-described methods in the context of software routines periodically executed by processor 12 of host vehicle 10.

Figure 2A:
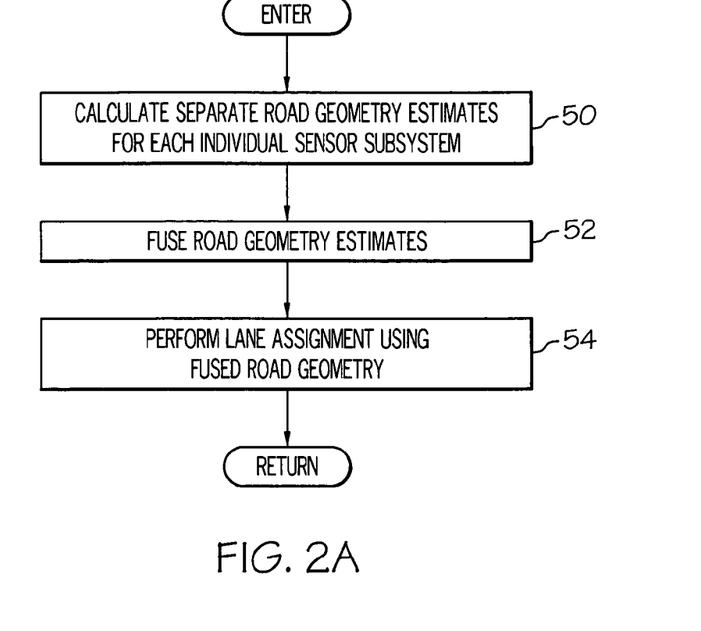
FIG. 2A is a flow diagram describing a probabilistic lane assignment method in which road/lane model parameters from different sensor sub-systems are fused prior to assessing lane assignment.
Figure 2B:
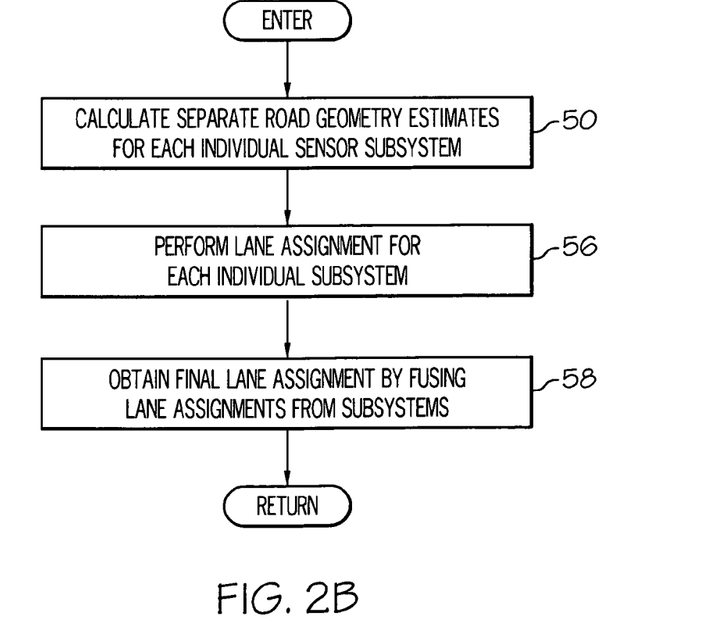
FIG. 2B is a flow diagram describing a probabilistic lane assignment method in which lane assignments based on road/lane model parameters from different sensor sub-systems are fused to form a single lane assignment.

The flow diagrams of FIGS. 2A-2B describe the alternate approaches to fusing information obtained from radar and vision sensors 26, 28 with compatible information obtained from other sensor sub-systems. In each case, the block 50 is first executed to calculate separate road/lane model estimates defined in equation (4) for each sensor sub-system. In the method of FIG. 2A, the blocks 52 and 54 are then sequentially executed to fuse the separately calculated road/lane model estimates, and perform lane assignment (using either the discrete or continuous methodologies) based on the fused road/lane model parameters. In the method of FIG. 2B, the blocks 56 and 58 are executed following block 50 to perform separate lane assignments for a detected object using the different sensor sub-systems, and then obtain a final lane assignment by fusing the separately determined lane assignments.

Figure 3:
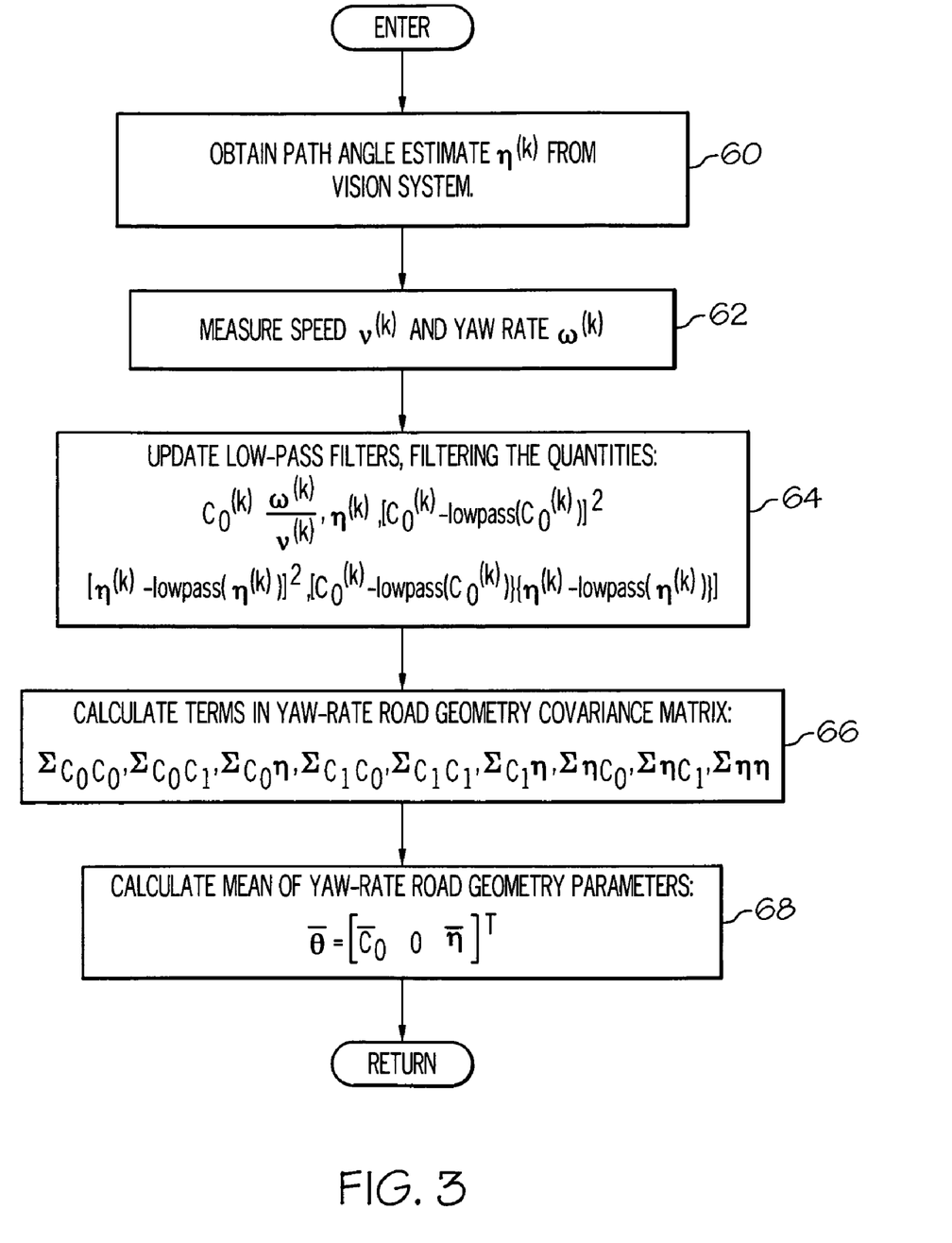
FIG. 3 is a flow diagram representative of a software routine executed by a host vehicle processor for estimating road/lane model parameters according to this invention.

The flow diagram of FIG. 3 describes estimation of the road/lane model parameters defined in equation (4). Blocks 60 and 62 are first executed to obtain a path angle sample $\eta^{(k)}$, a speed sample $v^{(k)}$ and a yaw-rate sample $\omega^{(k)}$. Alternately, $\eta^{(k)}$ may be set to a default value of zero if there is no vision system 28 or the path angle cannot be reliably determined, or its value may be estimated using scene tracking as described, for example, in technical papers by J. Schiffmann and G. Widmann, "Model-Based Scene Tracking Using Radar Sensors for Intelligent Automotive Vehicle Systems", and Z. Zomotor and U. Franke, "Sensor Fusion for Improved Vision Based Lane Recognition and Object Tracking with Range Finders", both appearing in the Proceedings of the IEEE Conference on Intelligent Transportation Systems, Boston (1997). Block 64 is then executed to calculate the road/lane model parameter $c_0^{(k)}$ as described in equation (5), and the update the low pass filter terms used in equations (8a) through (10a). As mentioned above, the road/lane model parameter $c_1^{(k)}$ describing the downrange rate of change in road curvature is assumed to be zero. Block 66 computes the terms of the covariance matrix $\Sigma_{\theta\theta}$ as defined in equation (7), and block 68 completes the routine by using the terms of blocks 64-66 to determine the mean of the road/lane model parameter set as defined in equation (4).

Figure 4A:
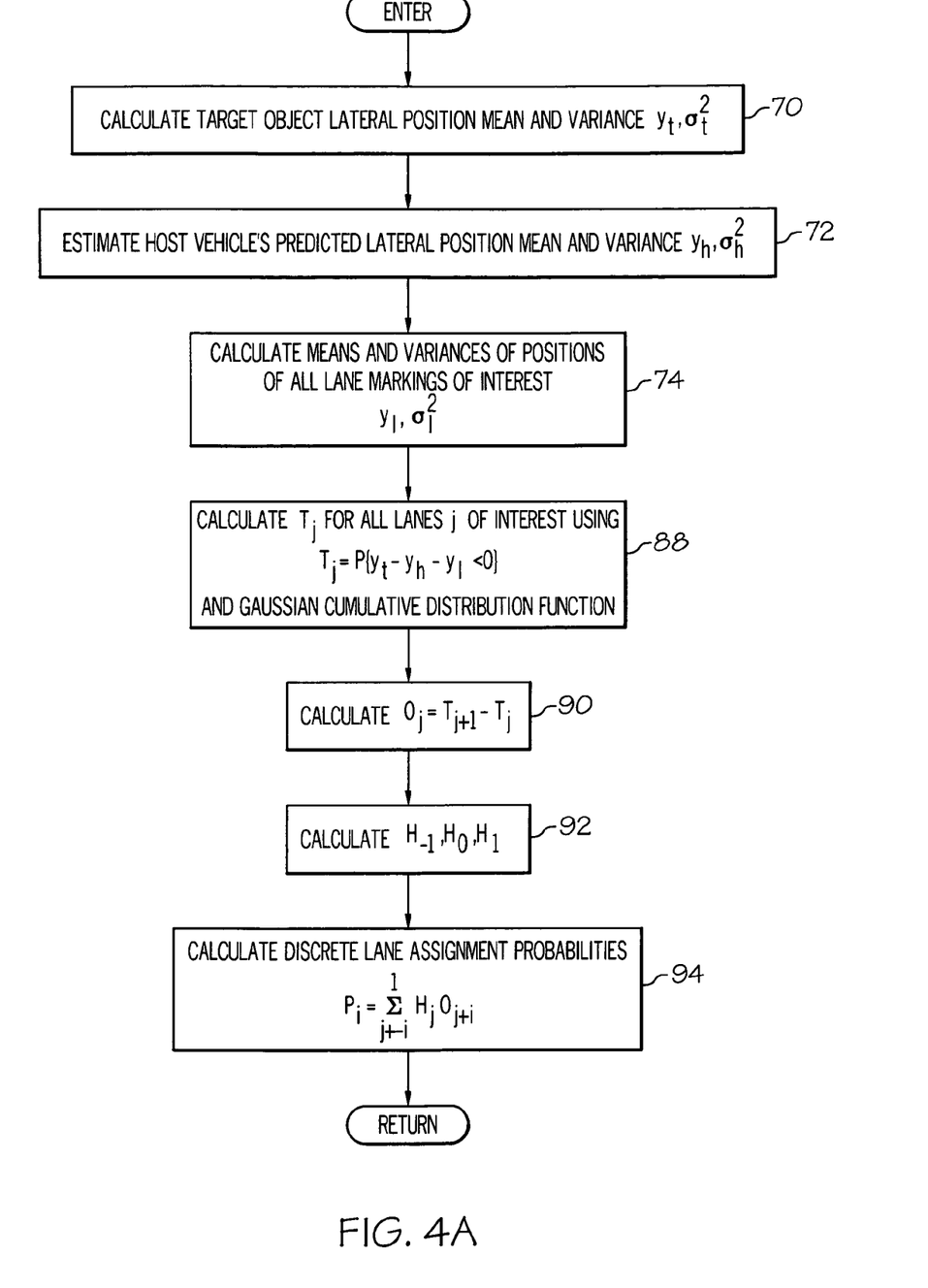
FIGS. 4A and 4B form a flow diagram representative of a software routine executed by a host vehicle processor for performing a discrete lane assignment for a detected object according to this invention.
Figure 4B:
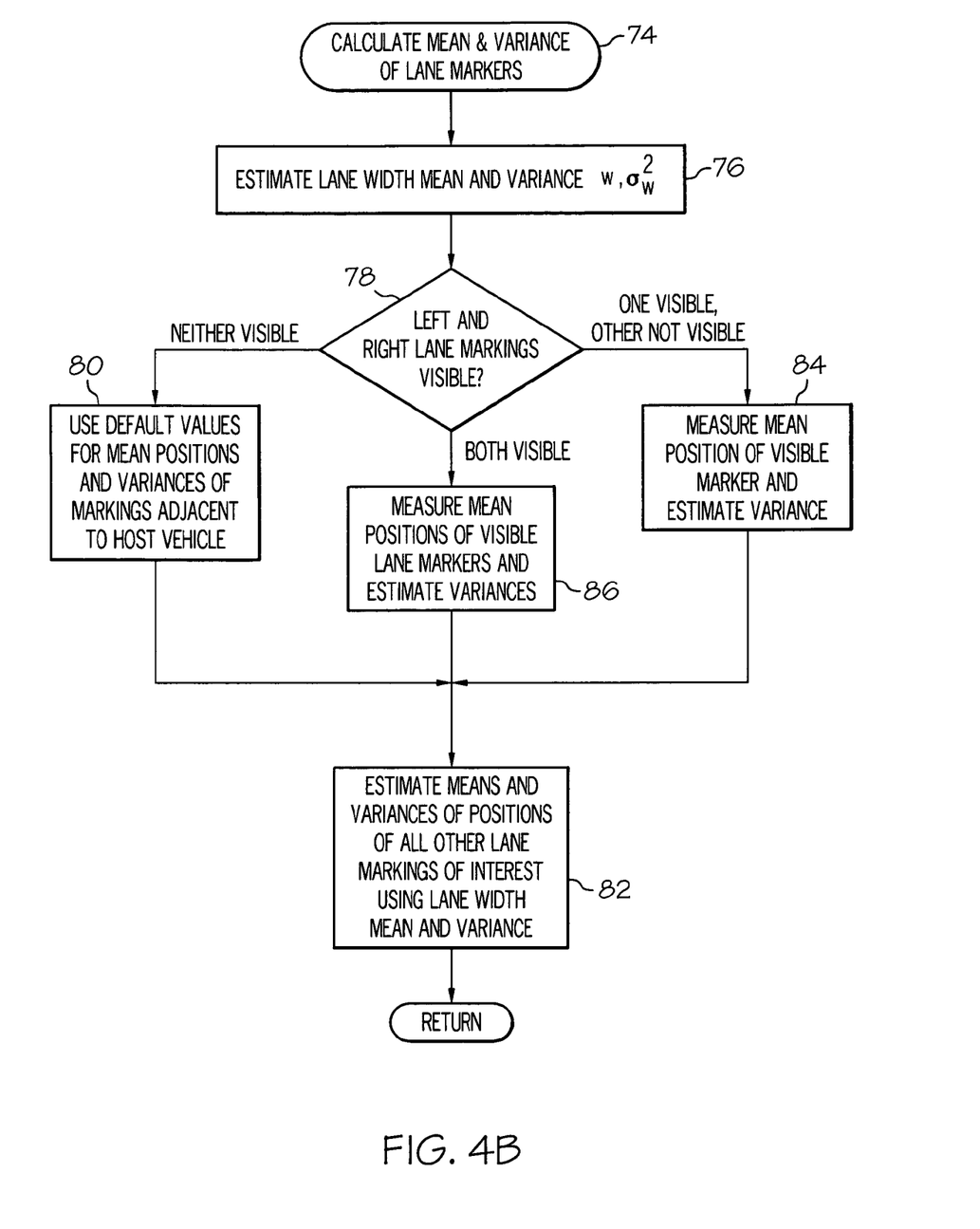

The flow diagrams of FIG. 4A-4B describe the discrete method of lane assignment. Referring first to FIG. 4A, the blocks 70 and 72 are first executed to determine the mean and variance of the lateral distances $y_t$ and $y_h$. The radar system 26 provides the mean and variance of $y_t$, equation (3) is used to compute $y_h$, and the mean and variance of $y_h$ are determined by combining the means and variances of the parameters $c_0$, $\eta$ and x used to compute $y_h$. The block 74, expanded upon in the flow diagram of FIG. 4B, determines the means and variances of the lane markers of interest.

Referring to FIG. 4B, the first step is to estimate the mean and variance of the lane width w, as indicated at block 76. Block 78 identifies three possible conditions in respect to the visibility of lane markers 18 and 20 bounding host lane 14b. If neither lane marker 18, 20 is visible, block 80 is executed to retrieve default values for the mean and variance terms, whereafter block 82 estimates the means and variances for the lane markers of interest based on the default values and the mean and variance of lane width w. If only one of lane markers 18, 20 is visible, block 84 is executed to measure the mean position of the visible lane marker and estimate its variance, whereafter block 82 estimates the means and variances for the lane markers of interest based on the mean and variance of the visible marker and the mean and variance of lane width w. And finally, if both lane markers 18 and 20 are visible, block 86 measures the mean positions of the lane markers 18, 20 and estimates their variances, whereafter block 82 estimates the means and variances for the lane markers of interest based on the measured means, the estimated variances, and the mean and variance of lane width w.

Returning to the flow diagram of FIG. 4A, the block 88 is executed to calculate the probability $T_j$ that the detected object is to the left of lane marker j (for all lane markers of interest), along with the corresponding cumulative distribution functions based on the Gaussian distributions of $y_t$, $y_h$ and $y_l$. Then blocks 90 and 92 calculate the probabilities $O_j$ and $H_j$. The probability $O_j$ that the detected object is j lanes to the right of lane 14b (for all lanes of interest) is calculated using equation (12), while the probabilities $H_{-1}$, $H_0$ and $H_1$ that host vehicle 10 is in lanes 14a, 14b and 14c, respectively, are calculated by allotting the Gaussian distributions for the lane markers 18, 20 relative to the host coordinate system origin as described above. Finally, the block 94 computes the various discrete lane assignment probabilities $P_i$ that the detected object is i lanes to the right of host vehicle 10 (i.e., for i=−3 to +3) using equation (11).

Figure 5:
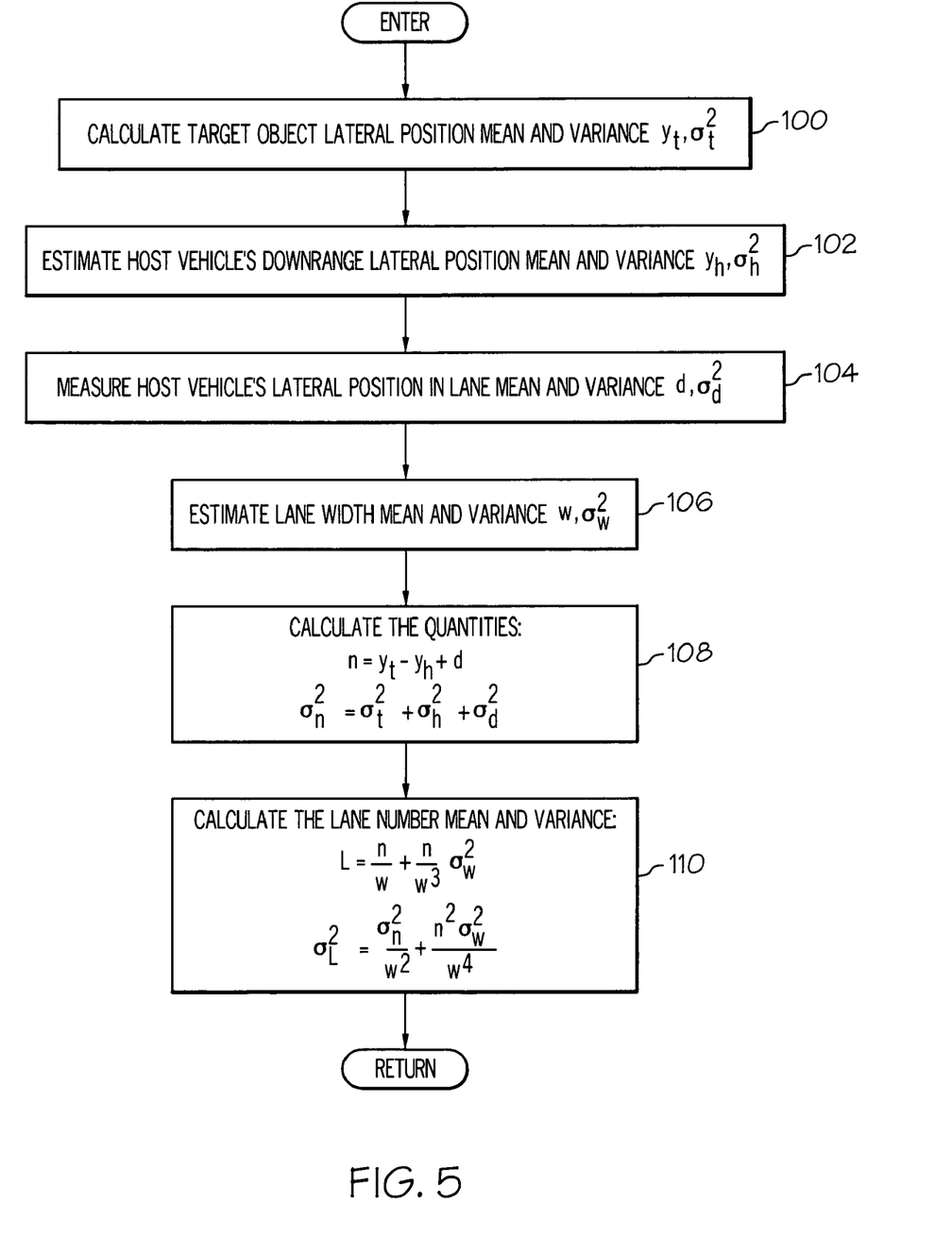
FIG. 5 is a flow diagram representative of a software routine executed by a host vehicle processor for performing a continuous lane assignment for a detected object according to this invention.

The flow diagram of FIG. 5 describes the continuous method of lane assignment. The blocks 100 and 102 are first executed to determine the mean and variance of the lateral positions $y_t$ and $y_h$, as described above in reference to blocks 70 and 72, respectively, of FIG. 4A. Block 104 measures the mean and variance of the lateral position d of host vehicle 10 in lane 14b, and block 106 estimates the mean and variance of lane width w. Finally, blocks 108 and 110 are executed to calculate the mean and variance of the lane number L of the detected object using equations (17)-(20).

As demonstrated above, the probabilistic lane assignment methods of this invention take into account uncertainty in all measured and estimated parameters, providing a reliable and realistic degree-of-belief in the indicated lane assignment. And the disclosed methods provide virtually immediate lane assignment for detected objects, since they are not based on the prior art method of assessing the fidelity of hypothesized object trajectories with measured object trajectories.

While the lane assignment methods have been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A probabilistic lane assignment method for an object in a scene forward of a host, where the host is traveling in one lane of a multiple lane road, the method comprising the steps of:
   determining an off-center distance of the host from a center of said one lane, and estimating a mean of said off-center distance and a variance that reflects uncertainty in the determination of said off-center distance;
   sensing downrange and lateral coordinates of the object relative to a host coordinate system, and estimating a mean of said lateral coordinate and a variance that reflects uncertainty in the sensing of said lateral coordinate;
   determining an apparent curvature of the host ego lane, and estimating a mean of said curvature and a variance that reflects uncertainty in the determination of said curvature;
   determining a lateral coordinate of the host's ego lane center at the obtained downrange coordinate of the object, and estimating a mean of said lateral coordinate of the host's ego lane center and a variance based on at least the estimated mean and variance of said apparent curvature;
   determining a width of said one lane, and estimating a mean of said width and a variance that reflects uncertainty in the determination of said width;
   combining the mean and variance of at least the lateral coordinate of the object, with the mean and variance of the determined lateral coordinate of the host's ego lane center at the downrange coordinate of the object, and with the mean and variance of the determined lane width to form a lane assignment for the object, said lane assignment including a lane designation and an indication of confidence or degree-of-belief in the lane designation;
   determining a variance of said lane assignment by combining the mean and variance of the lateral coordinate of the object, with the mean and variance of the lateral coordinate of the host's ego lane center at the obtained downrange coordinate of the object, with the mean and variance of the off-center distance, and with the mean and variance of the determined width of said one lane; and
   utilizing the calculated lane assignment to assess a threat the object poses to the host.

2. The probabilistic lane assignment method of claim 1, where:
   the variance that reflects uncertainty in the determination of said apparent curvature is represented by covariance matrix elements that reflect a difference between said apparent curvature and the estimated mean of said apparent curvature.

3. The probabilistic lane assignment method of claim 2, including the steps of:
   low-pass filtering the apparent curvature to estimate the mean of the apparent curvature; and low-pass filtering the squared difference between said apparent curvature and the estimated mean of said apparent curvature to estimate said covariance matrix elements.

4. The probabilistic lane assignment method of claim 1, including the steps of:
   determining an angular orientation of the host within said one lane, and estimating a mean of said angular orientation and a variance that reflects uncertainty in the determination of the angular orientation; and
   determining said lateral coordinate of the ego lane center at the downrange coordinate of the object based at least on the estimated means and variances of said apparent curvature and said determined angular orientation.

5. The probabilistic lane assignment method of claim 4, where:
   the variance that reflects uncertainty in the determination of said angular orientation is represented by covariance matrix elements that reflect a difference between said angular orientation and the estimated mean of said angular orientation.

6. The probabilistic lane assignment method of claim 5, including the steps of:
   low-pass filtering the angular orientation to estimate the mean of the angular orientation; and
   low-pass filtering the squared difference between said angular orientation and the estimated mean of said angular orientation to estimate said covariance matrix elements.

7. The probabilistic lane assignment method of claim 1, where:
   said lane assignment includes a confidence or degree-of-belief that said object is within a given lane of said road.

8. The probabilistic lane assignment method of claim 7, including the steps of:
   determining coordinates of lane markers that bound said lanes, and estimating means of said coordinates and variances that reflect uncertainty in the determination of said lane marker coordinates; and
   combining the mean and variance of at least the lateral coordinate of the object, with the mean and variance of the determined lateral coordinate of the ego lane center at the downrange coordinate of the object, and with the means and variances of the determined lane marker coordinates to form a lane assignment for the object.

9. The probabilistic lane assignment method of claim 8, including the steps of:
   determining a probability Pi that the object is i lanes in a given direction away from the host according to:

$$Pi = \sum_{j=-1}^{1} Hj * Oj + 1$$

where Hj is the probability that the host is j lanes in the given direction away from said one lane, and Oj is the probability that the object is j lanes in the given direction away from said one lane.

10. The probabilistic lane assignment method of claim 9, including the steps of:
   forming probability mass distributions for the lane marker coordinates bounding said one lane based on the estimated means and variances of said lane marker coordinates; and
   apportioning the probability mass distributions among said one lane and the lanes adjacent said one lane to determine H−1, H and H+1.

11. The probabilistic lane assignment method of claim 1, where:
   said lane assignment includes a lane number L indicating a lateral offset distance of said object relative to said host, and a confidence or degree-of-belief in said lane number L.

12. The probabilistic lane assignment method of claim 11, including the steps of:
   determining an off-center distance of the host from a center of said one lane, and estimating a mean of said off-center distance and a variance that reflect uncertainty in the determination of said off-center distance; and
   determining said lane number L by combining the mean of the lateral coordinate of the object, with the mean of the lateral coordinate of the host's ego lane center at the obtained downrange coordinate of the object, with the mean of the off-center distance and with the mean of the determined lane width, and with the variance of the determined lane width.

13. The probabilistic lane assignment method of claim 11, including the step of:
   determining a variance of the lane number L to form the confidence or degree-of-belief in said lane number L.

14. The probabilistic lane assignment method of claim 13, where the step of determining the variance of lane number L includes the steps of:
   determining an off-center distance of the host from a center of said one lane, and estimating a mean of said off-center distance and a variance that reflect uncertainty in the determination of said off-center distance; and
   determining the variance of said lane number L by combining the mean and variance of the lateral coordinate of the object, with the mean and variance of the lateral coordinate of the host's ego lane center at the obtained downrange coordinate of the object, with the mean and variance of the off-center distance and with the mean and variance of the determined lane width.

* * * * *